US012576605B2

(12) United States Patent
Debordeaux et al.

(10) Patent No.: US 12,576,605 B2
(45) Date of Patent: Mar. 17, 2026

(54) TIRE CURING MOLD HAVING A REMOVABLE INSERT, AND ASSOCIATED MANUFACTURING METHOD

(71) Applicant: COMPAGNIE GENERALE DES ETABLISSEMENTS MICHELIN, Clermont-Ferrand (FR)

(72) Inventors: Heloise Debordeaux, Clermont-Ferrand (FR); Jean-Claude Desvignes, Clermont-Ferrand (FR); Alain Baptiste, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 881 days.

(21) Appl. No.: 17/770,741

(22) PCT Filed: Oct. 22, 2020

(86) PCT No.: PCT/FR2020/051910
§ 371 (c)(1),
(2) Date: Apr. 21, 2022

(87) PCT Pub. No.: WO2021/079070
PCT Pub. Date: Apr. 29, 2021

(65) Prior Publication Data
US 2022/0371295 A1      Nov. 24, 2022

(30) Foreign Application Priority Data
Oct. 24, 2019    (FR) ...................................... 1911924

(51) Int. Cl.
B29D 30/06 (2006.01)
B29D 30/72 (2006.01)
B60C 13/00 (2006.01)

(52) U.S. Cl.
CPC ......... *B29D 30/0606* (2013.01); *B29D 30/72* (2013.01); *B60C 13/001* (2013.01); *B29D 2030/0612* (2013.01); *B29D 2030/726* (2013.01)

(58) Field of Classification Search
CPC ................ B29D 30/0606; B29D 30/72; B29D 2030/0607; B29D 2030/0612; B29D 2030/726; B60C 13/001; B60C 13/02
(Continued)

(56) References Cited

U.S. PATENT DOCUMENTS 4,444,713 A     4/1984  Egan et al.
8,875,763 B2   11/2014  Paturle
(Continued)

FOREIGN PATENT DOCUMENTS

WO     2007/045425 A1    4/2007
WO     2009/007790 A1    1/2009
(Continued)

OTHER PUBLICATIONS

Desvignes J, WO-2016005572-A2, machine translation. (Year: 2016).*
(Continued)

*Primary Examiner* — Sedef E Paquette
(74) *Attorney, Agent, or Firm* — VENABLE LLP

(57)      ABSTRACT

A mold (20) for curing a tire comprises at least one body, such as a shell (21) or a lining, and at least one insert (22) mounted removably in a housing of the body, the molding surface (23) of the body having a first texture pattern (24), the molding surface (25) of the insert having a marking pattern (26). The molding surface of the insert also has a second texture pattern (27) chosen such that the surface molded by the second texture pattern contrasts with the
(Continued)

surface molded by the marking pattern (26), and contrasts barely, if at all, with the surface molded by the first texture pattern (24).

7 Claims, 5 Drawing Sheets

(58) Field of Classification Search
USPC ................................................... 425/28.1, 32
See application file for complete search history.

(56) References Cited

U.S. PATENT DOCUMENTS

| | | |
|---|---|---|
| 2009/0218019 A1 | 9/2009 | Paturle |
| 2011/0139326 A1 | 6/2011 | Nukushina |
| 2017/0080656 A1 | 3/2017 | Muhlhoff et al. |
| 2017/0157995 A1* | 6/2017 | Muhlhoff .................. B44C 1/00 |

FOREIGN PATENT DOCUMENTS

| | | | |
|---|---|---|---|
| WO | 2015/165862 A1 | 11/2015 | |
| WO | 2016/000985 A1 | 1/2016 | |
| WO | WO-2016005572 A2 * | 1/2016 | ........... B60C 13/001 |

OTHER PUBLICATIONS

International Search Report dated Jan. 22, 2021, in corresponding PCT/FR2020/051910 (5 pages).

* cited by examiner

TIRE CURING MOLD HAVING A REMOVABLE INSERT, AND ASSOCIATED MANUFACTURING METHOD

BACKGROUND

The invention lies in the field of tyre manufacturing and relates more particularly to a mould for curing a tyre, having a removable insert, and to a method for manufacturing such a mould.

The manufacture of a tyre comprises a curing step during which a green tyre is moulded and vulcanized so as to give the tyre its characteristics and its final appearance. The tyre is cured in a curing mould. A curing mould has, in a closed position of the mould, a moulding surface formed, in particular, by a lining, intended to mould the tread of the tyre, and two shells, intended to mould the sidewalls of the tyre.

The surface of a tyre comprises a large number of markings generally formed of protruding moulded elements. The markings are intended to provide legal technical information about the quality of the tyre, for the one part, and to allow the consumer to identify the brand and origin of the product, for the other. The protruding moulded elements are obtained using recessed moulding elements, which together form marking patterns situated on the moulding surface of the mould.

Some of the marking patterns need to be changed regularly. To this end, use is made of inserts or plates disposed removably in housings made in the moulding surface of the shell. The moulding surface of the insert has a given marking pattern.

An insert is generally obtained from an aluminium sheet on which the contour of the insert and the marking pattern are engraved by means of a routing process. The insert is then shaped and cut out of the aluminium sheet by means of a pressing process. Such a process has the advantage of being simple and inexpensive.

Furthermore, recent developments of tyres implement techniques for improving the visibility of the markings and the appearance of the tyre. For example, the application WO2007/045425, in the name of the applicant, describes a tyre, the surface of which comprises a texture formed by elements moulded in relief. The texture is matt black and reflects little if any light, in contrast to a smooth surface of the tyre. The texture is thus said to be "high-contrast" since is contrasts with surfaces that reflect more light.

Thus, a smooth surface of the tyre adjacent to a surface having one or more variants of said texture makes it possible to form a high-contrast pattern describing a marking or decoration. For example, the application WO2015/165862, in the name of the applicants, describes an insert intended to be fitted in a mould for curing a tyre. The insert has a pattern intended to mould a coded matrix symbol that contrasts with the sidewall of the tyre. Said pattern has sets of elements in relief designed to mould dark or light parts of the coded matrix symbol.

However, on seeking to cover the sidewall of a tyre with a high-contrast pattern, the applicants have found that the moulding surface of an insert, apart from the marking pattern, moulds on the surface of the tyre a smooth surface which reflects light and interferes with the high-contrast pattern that surrounds it. While the high-contrast pattern thus improves the visibility of the markings formed by removable inserts, said smooth surface impairing the appearance of the tyre and, consequently, limits the possibility of extending the high-contrast pattern circumferentially and radially to the entire sidewall.

There is therefore a need to form a high-contrast pattern that extends widely over the surface of a tyre, the appearance of which is not impaired by the surface moulded by the inserts.

SUMMARY OF THE INVENTION

To this end, the invention provides a mould for curing a tyre, said mould comprising at least one body, such as a shell or a lining, and at least one insert mounted removably in a housing of said body, said body and insert together forming a moulding surface for moulding a part of the tyre, such as the sidewall or the tread. The moulding surface of said body has a first texture pattern, and the moulding surface of said insert has a marking pattern.

DETAILED DESCRIPTION

A "pattern" is understood to mean that the moulding surface comprises a set of elements in relief with given dimensions, shape and arrangement. The elements in relief are able to mould, on the external surface of the tyre, a representation object, such as a marking or a decoration. The elements in relief are recessed and/or protrude with respect to a smooth moulding surface or, in other words, a moulding surface without a pattern. A smooth moulding surface forms, on the external surface of the tyre, a smooth surface that absorbs little light and appears to be lighter.

A moulding surface having a "texture pattern" forms, on the external surface of the tyre, a texture having elements in relief which absorb more light than a smooth surface, thereby appearing darker, more matt. In other words, said elements in relief reduce the capacity of the external surface of the tyre to reflect light. Depending on the characteristics of the elements in relief of the texture pattern, the light absorption properties of the texture vary, and the texture appears to be more or less dark.

A moulding surface having a "moulding marking" forms, on the external surface of the tyre, a marking having elements in relief, such as characters or symbols. A marking pattern is made up of one or more texture patterns.

According to the invention, the moulding surface of said insert also has a second texture pattern chosen such that the surface moulded by the second texture pattern contrasts with the surface moulded by the marking pattern, and for the most part does not contrast with the surface moulded by the first texture pattern.

The texture pattern of the insert makes it possible to mould, on the surface of the tyre, a matt texture that reflects little if any light. Thus, the visibility of the surface of the tyre that is moulded by the insert and does not form a marking is reduced and, consequently, does not impair the appearance of the tyre.

In one embodiment of the invention, the difference in lightness between the surfaces moulded by the first and second texture patterns is less than 1.5, preferably less than 1, and the difference in lightness between the surfaces moulded by the second texture pattern and the marking pattern is greater than or equal to 1.5, preferably greater than or equal to 3.

"Lightness", luminance or brightness, is understood to mean the parameter which characterizes the capacity of a surface to reflect light to a greater or lesser extent. A surface moulded by a given texture pattern defines a region of mean lightness $L^*$ calculated over the entirety of said region. The extent of the lightness over said region is less than 1.5, preferably less than 1.

The lightness L* is expressed using a scale that ranges from 0 to 100 according to the L*a*b colour model established by the CIE (International Commission on Illumination) in 1976. The value 100 represents white or total reflection; the value 0 represents black or total absorption. In this colour model, a* and b* are chromaticity coordinates. The colour model L*a*b indicates the direction of the colours: +a* goes towards red, −a* goes towards green, +b* towards yellow, and −b* towards blue. The centre of the diagram is achromatic. Saturation increases as the values a* and b* rise and thus with increasing distance from the centre of the diagram.

The lightness of a smooth moulded surface is greater than or equal to 18, and generally greater than or equal to 20. The lightness of a moulded surface, having a texture pattern, is less than the lightness of a smooth moulded surface.

A texture pattern of given mean lightness L* may be made up of identical or different elements in relief. The elements in relief of said pattern may be arranged in a random or organized manner.

Preferably, the second texture pattern and, even more preferably, the first texture pattern comprise integral, recessed or protruding, elements in relief of shortened or lengthened form. Thus, a wide variety of texture patterns exist, making it possible to mould textures of varied appearance.

"Integral" is understood as meaning that the elements in relief forming the pattern are produced by removing or adding material creating the moulding surface having the pattern.

Advantageously, the elements in relief of shortened form are disposed with a density at least equal to five elements per mm², and have a mean section circumscribed in a circle with a diameter of between 0.02 and 1 mm, preferably between 0.02 and 0.5 mm, and/or the elements of lengthened form are disposed with a spacing between each element at most equal to 0.5 mm, and have a mean width of between 0.02 and 0.5 mm.

Thus, the elements in relief forming the texture pattern very greatly increase the surface area of the moulding surface, and consequently of the external surface of the tyre. The absorption of light by the texture thus moulded is therefore greater.

Furthermore, such a texture pattern makes it possible to substantially reduce the problems associated with the evacuation of air during moulding. Thus, the need for venting means is reduced.

By way of example, the elements of lengthened form take the form of striations or blades, with a pyramidal crenellation profile. Preferably, the elements of lengthened form are substantially parallel to one another. The mean width corresponds to the mean of the widths measured at regular intervals in the depth of the striation or the height of the blade. The height of each blade or the depth of each striation is between 0.05 and 0.5 mm. The elements of lengthened form may be continuous or discontinuous and have differences in section, curvatures or angles between one another, in particular along their length, and have variable lengths.

By way of example, the elements of shortened form take the form of strands, cones or parallelepipeds. The mean section of each strand corresponds to the mean of the sections measured at regular intervals from the base of the strand. The strands have a conical overall shape with a section that decreases over the height of these strands. The cones have an angle at the top of between 20° and 120°, and a circular section. The parallelepipeds have sides with dimensions of between 0.05 mm and 0.5 mm. The height of each element of shortened shape is between 0.05 and 0.5 mm.

Preferably, the elements in relief are separated by intermediate regions. Moreover, the elements in relief are distributed regularly over the mould such that the distance between each element of the pattern is similar overall.

Alternatively, the section of the elements of shortened form may be circular or polygonal (for example hexagonal). The square or polygonal structures make it possible to more easily organize the arrangement of the elements of shortened form with respect to one another, so as to limit the area of the intermediate regions. Such forms make it possible to increase the density of the elements in relief of the pattern.

Preferably, the elements in relief forming the texture patterns are arranged in assemblies, the elements of each assembly being substantially identical and designed to mould textures with particular contrast levels.

Advantageously, the moulding surface of said bodies and inserts is made according to a particular model, said model being divided into a first part and a second part, the first texture pattern corresponding to the first part of the model, the second texture pattern corresponding to the second part of the model. The second part is at a distance of at most 0.5 mm, preferably 0.2 mm, from the first part so as to obtain excellent continuity between the parts.

Furthermore, during their research, the applicants have shown that the distance between the pattern engraved on the insert and the pattern engraved on the moulding element should not exceed 0.5 mm, in order that an observer at least 1 m away cannot detect any offset. The perception of the quality of the appearance of the tyre is thus improved.

Preferably, the mean difference in height or depth between the elements in relief of the first texture pattern and of the second texture pattern is less than 0.2 mm, preferably less than 0.1 mm. Thus, a limited mean difference in height or depth between the first and second textures improves the aerodynamic properties of the tyre.

Advantageously, said body takes the form of a shell intended to mould the sidewall of the tyre, the first texture pattern extending over the moulding surface of said shell so as to form an annular pattern surrounding said housing, the second texture pattern extending over the remaining moulding surface of the insert.

Thus, the surface moulded by the insert does not interfere with the texture that surrounds it, and improves the appearance of the sidewall of the tyre.

Preferably, the first texture pattern and the second texture pattern are identical or equivalent. "Identical" means that the elements in relief forming the patterns are uniform. "Equivalent" means that the patterns are able to mould textures having the same light absorption properties.

Thus, an observer at least 1 m away cannot detect the use of a removable insert to form a marking. Moreover, it is possible to extend a high-contrast pattern over the entire sidewall of a tyre.

The invention also relates to a method for manufacturing a mould for curing a tyre, said mould comprising at least one body, such as a shell or a lining, and at least one insert, said body and insert together forming a moulding surface for moulding a part of the tyre, such as the sidewall or the tread.

The method according to the invention comprises the following steps:

a first texture pattern is made on the moulding surface of said body, a marking pattern is made on the moulding surface of said insert, a second texture pattern is made on the moulding surface of said insert, the second pattern being chosen such that the surface moulded by the second texture pattern contrasts with the surface moulded by the marking pattern, and contrasts barely, if at all, with the surface moulded by the first texture pattern, the insert is fitted, removably, in a housing of said body.

Preferably, the moulding surface of said bodies and inserts is made according to a particular model, the method comprising the following steps:

using digital design means, the model is divided into a first part and a second part, the first texture pattern corresponding to the first part of the model, the second texture pattern corresponding to the second part of the model, using a digitally controlled engraving method, the first pattern is engraved on said body, according to the first part of the model, and the second pattern is engraved on said insert, according to the second part of the model, the second part being at a distance of at most 0.5 mm, preferably 0.2 mm, from the first part.

The step of digitally dividing the model corresponding to the moulding surface of the body and of the insert in order to carry out the engraving step makes it possible to form a texture on the insert corresponding precisely to the wishes of the applicants. The possibilities of representing markings or decorations on the surface of the tyre are thus extended.

Lastly, the use of digital means makes it possible to improve the precision of manufacture of the moulding element and, thus, makes it easier to control the distance between the pattern engraved on the insert and the pattern engraved on the moulding element.

Preferably, said insert is fitted in said housing with the aid of percussion means comprising a percussion surface made of a soft material, such as nylon or an elastomer material. Thus, the elements in relief of the texture patterns are not damaged.

The invention also relates to a method for manufacturing a tyre, in which a green tyre is cured in a curing mould according to the invention, and to a tyre intended to be mounted on the rim of a wheel and manufactured according to a method for manufacturing a tyre according to the invention.

BRIEF DESCRIPTION OF THE FIGURES

The invention will be understood better from the remainder of the description, which is based on the following figures.

In the various figures, elements that are identical or similar bear the same reference signs. Their description is therefore not systematically repeated.

Figure 1:
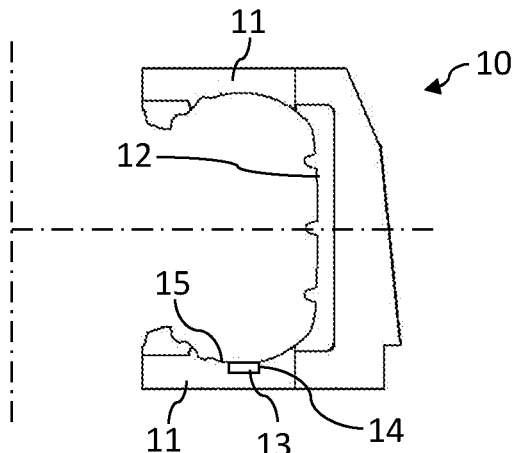
FIG. 1 is a simplified cross-sectional view illustrating certain components of a curing mould according to the prior art.

FIG. 1 illustrates certain customary components of a mould 10 for a curing a tyre (not illustrated), said mould comprising at least one body, such as a shell 11 or a lining 12, and an insert 13 mounted removably in a housing 14 of said body, said body and insert together forming a moulding surface 15 for moulding a part of the tyre, such as the sidewall or the tread.

Figure 2:
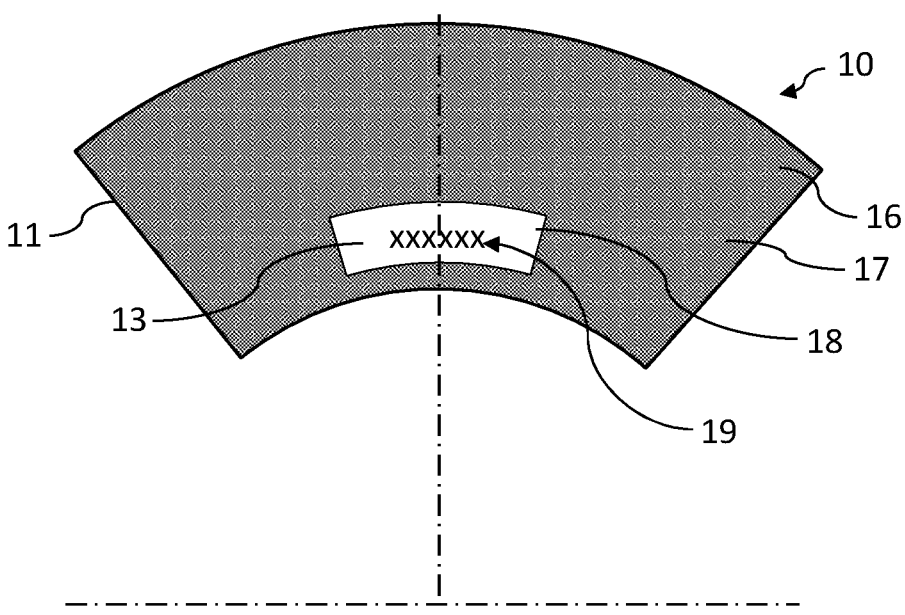
FIG. 2 is a frontal view illustrating certain components of the curing mould in FIG. 1.

FIG. 2 illustrates more particularly a part of the shell 11 and the insert 13 of the mould 10. The moulding surface 16 of the shell has a texture pattern 17. The moulding surface 18 of the insert has a marking pattern 19. The moulding surface of the insert 18 which does not have a marking pattern has a smooth moulding surface. Thus, the insert moulds on the surface of the tyre a smooth surface that contrasts with the texture pattern 13 of the shell.

Figure 3:
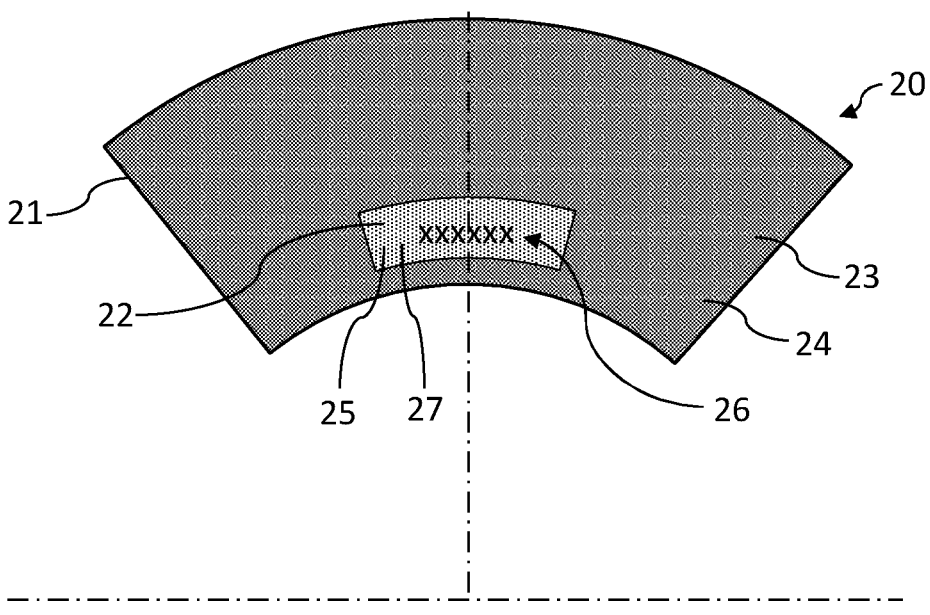
FIG. 3 is a frontal view illustrating certain components of a curing mould according to the invention in a first embodiment.

FIG. 3 illustrates the shell 21 and the insert 22 of a mould 20 according to the invention according to a first exemplary embodiment. The moulding surface 23 of the shell 21 has a first texture pattern 24, and the moulding surface 25 of the insert 22 has a marking pattern 26.

According to the invention, the moulding surface of the insert 25 also has a second texture pattern 27 chosen such that the surface moulded by the second texture pattern contrasts with the surface moulded by the marking pattern 26, and contrasts barely, if at all, with the surface moulded by the first texture pattern 24.

Figure 4:
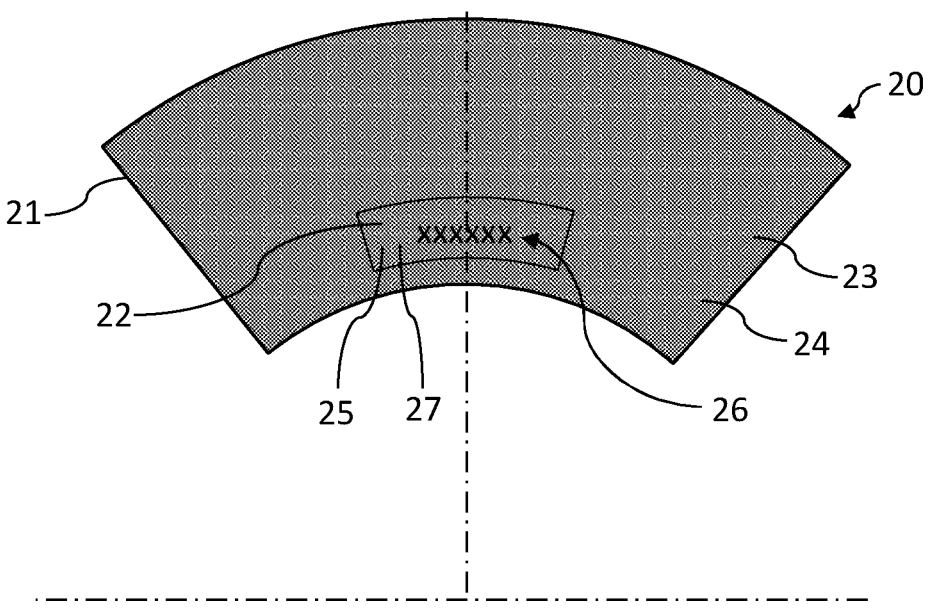
FIG. 4 is a frontal view illustrating certain components of a curing mould according to the invention in a second embodiment.

FIG. 4 illustrates the shell 21 and the insert 22 of the mould 20 according to the invention according to a second exemplary embodiment. The first texture pattern 24 and the second texture pattern 27 are identical, or equivalent in terms of light absorption properties.

The second texture pattern and, preferably, the first texture pattern comprise integral elements (not shown). The elements in relief are recessed or protrude and have a shortened or lengthened form, the elements of shortened form being disposed with a density at least equal to five elements per $mm^2$, and having a mean section circumscribed in a circle with a diameter of between 0.01 and 1 mm, preferably between 0.02 and 0.5 mm, the elements of lengthened form being disposed with a spacing between each element at most equal to 0.5 mm, and having a mean width of between 0.02 and 0.5 mm.

Figure 5:
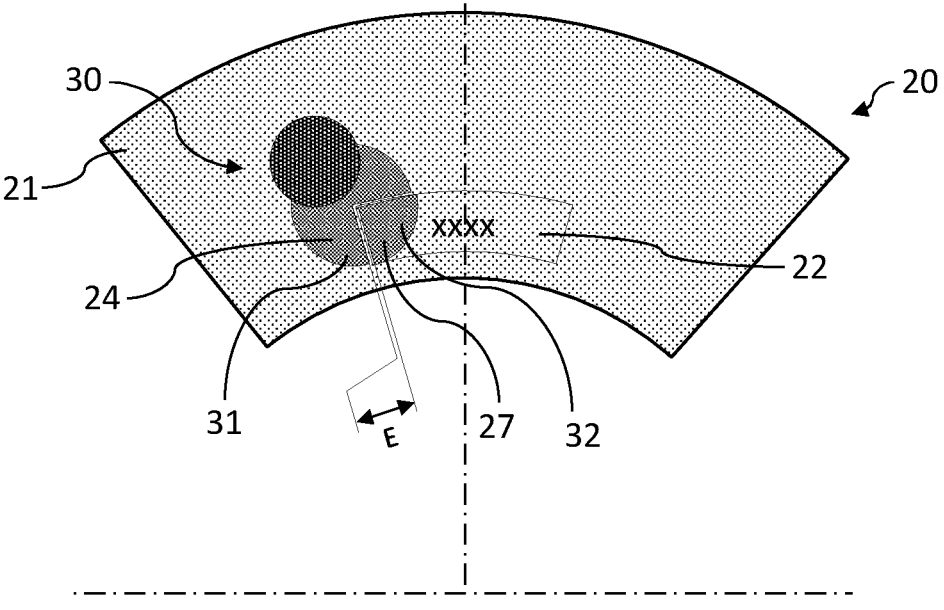
FIG. 5 is a frontal view illustrating certain components of a curing mould according to the invention in a third embodiment.

FIG. 5 illustrates the shell 21 and the insert 22 of the mould 20 according to the invention according to a third exemplary embodiment. The moulding surface of said bodies and inserts is made according to a particular model 30, said model being divided into a first part 31 and a second part 32, the first texture pattern 24 corresponding to the first part of the model, the second texture pattern 27 corresponding to the second part of the model, the second part being at a distance E of at most 0.5 mm, preferably 0.2 mm, from the first part.

To determine if the difference in lightness between the surfaces moulded by the different textures meets the requirements, the mean lightness L* of each texture on a tyre is measured using the appropriate measuring appliance.

In one non-limiting example, the appropriate measuring appliance is a Konica-Minolta CM 700D spectrocolorimeter. This appliance is suitable for measuring:

the lightness L*1, L*2 of a region of the tyre;

a component a* which defines a first colour shade between red and green;

a component b* which defines a second colour shade between yellow and blue.

Said appliance is positioned on the region of the tyre to be measured and said appliance gives the values of the three parameters L*, a* and b* relative to said region. These measurements are taken using the SCI (specular component included) mode, set at an angle of 10° and with a D65 type light setting (setting as defined by the International Commission on Illumination, CIE).

The manufacture of a curing mould 20 according to the invention comprises the following steps.

Using digital design means, the model 30 is divided into a first part 31 and a second part 32, the first texture pattern corresponding to the first part of the model, the second texture pattern corresponding to the second part of the model. Preferably, the contour of the second pattern corresponds to the contour of the insert 22.

Next, starting from an aluminium sheet, the insert is cut out along the contour and then the marking pattern is engraved using a routing process. The insert is then shaped. Alternatively, the steps of cutting and engraving can take place after the shaping step. The cutting and the engraving of the marking pattern can be carried out by laser cutting and engraving means.

Next, using a digitally controlled engraving method, the first texture pattern is engraved on said body, according to the first part of the model, and the second texture pattern is engraved on said insert, according to the second part of the model.

Finally, the insert is fitted, removably, in a housing 24 of the shell 21 with the aid of percussion means comprising a percussion surface made of a soft material, such as nylon or an elastomer material.

Other variants and embodiments of the invention can be envisaged without departing from the scope of its claims.

Thus, the insert 22 is disposed in the housing 14 with a mounting clearance between the contour of the housing and the contour of the insert, and the mounting clearance and the materials of which the insert 22 and the shell 21 are made are chosen such that, when the mould reaches a given temperature, the mounting clearance is partially or entirely reduced.

Thus, rubber flash brought about by the mounting clearance between the contour of the housing and the contour of the insert are reduced, and there is no break between the pattern of the moulding element and the pattern of the insert, thereby improving the continuity of the high-contrast pattern moulded on the tyre.

The invention claimed is:

1. A mold for curing a tire, the mold comprising a body and an insert mounted removably in a housing of the body, the body and the insert together forming a molding surface for molding a part of the tire, the molding surface of the body having a first texture pattern, and the molding surface of the insert having a marking pattern, wherein the molding surface of the insert also has a second texture pattern configured such that:

a difference in lightness between a surface molded by the second texture pattern and a surface molded by the marking pattern is greater than or equal to 1.5, such that the surface molded by the second texture pattern contrasts with the surface molded by the marking pattern, and a difference in lightness between a surface molded by the first texture pattern and the surface molded by the second texture pattern is less than 1.5, such that the second texture pattern contrasts barely, if at all, with the surface molded by the first texture pattern, wherein the body is in a form of a shell intended to mold a sidewall of the tire, the first texture pattern extending over a molding surface of the shell so as to form an annular pattern surrounding the housing, and the second texture pattern extending over a remaining molding surface of the insert removably mounted in the housing, wherein there is no break between the first texture pattern and the second texture pattern, wherein the second texture pattern comprises integral recessed or protruding elements of shortened form or elements of lengthened form, and wherein the elements of shortened form are disposed with a density at least equal to five elements per $mm^2$ and have a mean section circumscribed in a circle with a diameter of between 0.01 and 1 mm, or the elements of lengthened form are disposed with a spacing between each element at most equal to 0.5 mm and have a mean width of between 0.02 and 0.5 mm.

2. The mold according to claim 1, wherein the elements are arranged in assemblies, the elements of each assembly being substantially identical and designed to mold textures with particular contrast levels.

3. The mold according to claim 1, wherein the molding surface of the body and the molding surface of the insert are made according to a model, the model being divided into a first part and a second part, the first texture pattern corresponding to the first part of the model, and the second texture pattern corresponding to the second part of the model, and the second part being at a distance of at most 0.5 mm from the first part.

4. The mold according to claim 1, wherein a mean difference in height or depth between the first texture pattern and the second texture pattern is less than 0.2 mm.

5. A method for manufacturing a mold for curing a tire, the mold comprising a body and an insert, the body and the insert together forming a molding surface for molding a part of the tire, the method comprising:

making a first texture pattern on the molding surface of the body;

making a marking pattern on the molding surface of the insert;

making a second texture pattern on the molding surface of the insert, the second texture pattern being chosen such that:

a difference in lightness between a surface molded by the second texture pattern and a surface molded by the marking pattern is greater than or equal to 1.5 such that the surface molded by the second texture pattern contrasts with the surface molded by the marking pattern, and a difference in lightness between a surface molded by the first texture pattern and the surface molded by the second texture pattern is less than 1.5, preferably less than 1, such that the second texture pattern contrasts barely, if at all, with the surface molded by the first texture pattern; and fitting the insert, removably, in a housing of the body, wherein the body is configured to be in a form of a shell intended to mold a sidewall of the tire, the first texture pattern extending over the molding surface of the shell so as to form an annular pattern surrounding a housing, and the second texture pattern extending over a remaining molding surface of the insert removably mounted in the housing, wherein the first texture pattern and the second texture pattern are configured such that there is no break between the first texture pattern and the second texture pattern, wherein the second texture pattern comprises integral recessed or protruding elements of shortened form or elements of lengthened form, and wherein the elements of shortened form are disposed with a density at least equal to five elements per mm$^2$ and have a mean section circumscribed in a circle with a diameter of between 0.01 and 1 mm, or the elements of lengthened form are disposed with a spacing between each element at most equal to 0.5 mm and have a mean width of between 0.02 and 0.5 mm.

6. A method for manufacturing a tire, wherein a green tire is cured in the mold according to claim 1.

7. A tire intended to be mounted on a rim of a wheel and manufactured using the method according to claim 6.

\* \* \* \* \*